United States Patent [19]

Videlock et al.

[11] Patent Number: 5,136,580
[45] Date of Patent: Aug. 4, 1992

[54] APPARATUS AND METHOD FOR LEARNING AND FILTERING DESTINATION AND SOURCE ADDRESSES IN A LOCAL AREA NETWORK SYSTEM

[75] Inventors: Gary B. Videlock, Foxborough; Russell C. Gocht, North Attleboro; AnneMarie Freitas; Mark J. Freitas, both of E. Walpole, all of Mass.

[73] Assignee: Microcom Systems, Inc., Wilmington, Del.

[21] Appl. No.: 524,162

[22] Filed: May 16, 1990

[51] Int. Cl.⁵ .............................................. H04J 3/24
[52] U.S. Cl. ...................................... 370/60; 370/61; 370/85.13; 370/94.1
[58] Field of Search ...................... 370/16, 54, 60, 60.1, 370/61, 85.1, 85.2, 85.3, 85.5, 85.9, 85.13, 85.14, 92, 93, 94.1, 94.3; 340/825.05, 825.5, 825.51, 825.52, 825.53

[56] References Cited

U.S. PATENT DOCUMENTS

| | | | |
|---|---|---|---|
| 4,597,078 | 6/1986 | Kempf | 370/85.13 |
| 4,627,052 | 12/1986 | Hoare et al. | 370/85.13 |
| 4,706,081 | 11/1987 | Hart et al. | 370/61 |
| 4,715,030 | 12/1987 | Koch et al. | 370/85.13 |
| 4,831,620 | 5/1989 | Conway et al. | 370/85.13 |
| 5,027,350 | 6/1991 | Marshall | 370/85.13 |

Primary Examiner—Douglas W. Olms
Assistant Examiner—Alpus H. Hsu
Attorney, Agent, or Firm—Schiller & Kusmer

[57] ABSTRACT

An apparatus and method for learning and filtering destination and source addresses in a local area network (LAN) system is provided to facilitate the transfer of information packets from one local area network to another. The apparatus provides a link between two (or more) remotely located LANS through the use of a LAN bridge. The apparatus has a LAN controller interface, a microprocessor, a state machine and one or more content addressable memories which function to monitor an information packet received from the LAN. One such apparatus is connected to each of the LANs to be interfaced and each of these apparatus to each other in order to communicate messages between the LANs. Upon detection of an information packet, the apparatus examines both the source and destination addresses of the packet. The source address is compared to a dynamically generated table of source addresses and then compared to the incoming destination address. If the destination address is found in the table of source addresses, than the packet is destined for a node on the local LAN and thus will not be sent over the bridge between the two LANs. If, on the other hand, the destination address is not in the table, the packet is forwarded to the remote LAN.

15 Claims, 6 Drawing Sheets

APPARATUS AND METHOD FOR LEARNING AND FILTERING DESTINATION AND SOURCE ADDRESSES IN A LOCAL AREA NETWORK SYSTEM

A portion of the disclosure of this patent document contains material which is subject to copyright protection. The copyright owner has no objection to facsimile reproduction by anyone of the patent document or the patent disclosure, as it appears in the Patent and Trademark Office file or records, but otherwise reserves all copyrights whatsoever.

BACKGROUND OF THE INVENTION

This invention relates generally to Local Area Network (LAN) systems, and more particularly to a system in which two or more separate LANs may be connected or "bridged" so that traffic between LANs is restricted to those destinations which are in the remote LAN. This results in more efficient use of the processor control in the bridge device and faster throughput of messages from one LAN to another.

The computer industry has recently seen the widespread growth of LAN systems. A LAN is, broadly, a computer communications system which is shared by users in a limited (hence the terminology local) locale to share information and resources. A wide area network (WAN) is, by comparison, a computer communications system in which the users are dispersed over an unlimited geographical area (hence the terminology wide). LANs and WANs come in many varieties and types. A good description of LAN types and their respective functioning is given in *Understanding Local Area Networks*, by S. Schatt, published by Howard W. Sams & Co., 1989. WANs may take the form of a large single interconnected system or be composed of a plurality of LANs connected together so as to form a WAN. It is to the latter of these systems to which the invention of the present invention pertains.

The present invention relates to WANs composed of a number of interconnected LANs. These LANs may already have been in existence and the user may have a need to connect them in some fashion because, for example, the company has opened a new office with its own LAN system to which the home office must communicate. The company has the choice of developing a new WAN system so that both offices may be connected or may utilize the existing separate LANs and provide some means to allow the two systems to communicate. Also, the company may have a preference for a particular type or brand of LAN and a wish to remain with that system. Additionally, the needs of a particular user will depend on the functionality demanded. For example, a user may merely have a need to transfer batch information from on LAN to another on an occasional basis. On the other hand, the user may have a need to have a continual transfer of information between the LANs and the need to have this transfer take place seamlessly. It is to the latter functionality that the device of the present invention pertains. Each of the LANs usually contains a plurality of stations or nodes, which can both receive and transmit information to other stations and nodes.

Two of the more popular LAN systems commercially available today are the Ethernet and Token Ring LAN systems. These LANs are described and specified, respectively, by IEEE Recommendations 802.3 and 802.5. They differ from one another both as to the physical structure and as to the structure of their information packets. A thorough description of the respective systems is contained in the publication *Understanding Local Area Networks* referred to above. In particular, the structure of the packets presents different problems when attempting to interface two LANs utilizing either of these types. However, in both types of LANs and in LANs other than those of the Ethernet or Token Ring type, the structure of the information packets has both a source identification (Source ID) and a destination identification (Destination ID), so that the sender node and receiver node can communicate and so that the receiver node can acknowledge to the sender node whether or not the message has been received. The present invention, although not restricted in any way to the interfacing of two LANs (both of which are either of the Ethernet or Token Ring type), allows the efficient flow of messages from one LAN to another, as will be hereinafter described.

A fundamental problem encountered by the interfacing of two LANs, either locally or remotely, is that when a station or node on one of the LANs (with a certain Source ID or address) wants to send a message to another node (with a certain Destination ID or address), the source node may not know whether the destination node is located on its own LAN or on the other LAN. Thus, in certain circumstances, the bridging circuitry may automatically send all information packets to the remote LAN, even if the destination node is not on the other LAN. This takes up valuable processor time in the processor contained in the bridging circuitry. As a result, the throughput from one LAN to the other over the link between the two LANs may decrease, leading to inefficiency in the system.

Other than simply ignoring the fact that it may not be known whether the destination node is on one LAN or another, it is possible to provide a method by way of a software solution under which not all packets are sent to the remote LAN. Under this solution, all destination ID comparisons are accomplished in software, but only after the complete packet is received. An address table is built into the software of the bridge system to learn the source addresses. Unfortunately, due to the nature of the low level Token Ring protocol, the Address Recognized/Frame Copied indicator bits, which appear at the end of the packet after the Ending Delimiter, must be set in real time. A description of the foregoing structure is given in *Token Ring Access Method and Physical Layer Specifications*, published by the IEEE, 1985, pages 27 39, as well as in the *Understanding Local Area Networks* publication referred to above, especially at pages 46–47 and 79–106. The node must know that the packet was addressed to the node and that there is a buffer available. This is easily accomplished by the Token Ring Controller IC in a single address environment (such as a workstation or server), but in a transparent bridge environment, where every packet must be looked at, this can only be accomplished in hardware. It can be ignored by the transparent bridge designer because the low level protocol is ignored by some workstation/server software developers, but there are those packages that do not ignore the protocol and will indicate fault on the network if the bits are not set properly.

It is therefore a principal object of the present invention to provide an apparatus and method for learning and filtering destination and source addresses in a local area network system.

It is another object of the present invention to improve throughput for communications from one LAN to another LAN over the device which embodies the present invention by using the processor only for information packets which will be forwarded to the remote LAN.

It is yet another object of this invention to facilitate communication between two LANs of the same type remotely located regardless of whether the LANs are of the Ethernet or the Token Ring variety.

SUMMARY OF THE INVENTION

In accordance with the present invention, when bridging data between two or more Local Area Networks (LANs) not all data must be exchanged. The embodiment of the present invention will learn the station addresses of the nodes attached to the bridge, and then filter out packets that are destined for these local nodes, thereby relieving link congestion.

The invention is composed of a state machine, which may be in the form of a programmable logic array (PLA), a microprocessor interface, a LAN controller chip interface, and one or more content addressable memories. The state machine monitors the LAN controller chip to determine when a new packet is being received from the LAN. It then monitors the LAN controller chip interface to evaluate the destination and source addresses. The source address is compared to a table of previously learned source addresses and added to the table if it is not already in the table. The table of source addresses is compared to the incoming destination address. If the destination address is found in the table of source addresses, then the packet is being sent to a node on the local LAN and should not be sent through the bridge. If the destination address is not found in the table, then the packet should be forwarded over the link to the other LAN.

There are various handshake bits between the state machine and the microprocessor interface. One of the bits insures that the microprocessor reads the learned source address before another source address can be learned. Another insures that the microprocessor does not access the table of source addresses unless the state machine is in a "holding" loop. The table of source addresses has a finite size. There is an indication to the microprocessor that indicates when the table is full.

This invention improves known technology by allowing the low-level Token Ring protocol Address Recognized Indicator (ARI) and Frame Copied Indicator (FCI) bits, found in the Frame Status (FS) byte that follows a packet, to be set in real time (as the packet is being relayed through the LAN receiver to the LAN transmitter). If these bits are not set correctly, then low level software may indicate LAN errors to the node's host processor, which could result in the node removing itself from the ring.

The present invention also gives the bridge, whether it be Ethernet or Token Ring, the ability to filter all LAN packets regardless of the load of data on the network. The filtering rate of the bridge is no longer a function of the performance of the microprocessor. The microprocessor will only be given packets that need to be forwarded to the remote LAN.

The present invention is facilitated by the availability of Content Addressable Memory (CAM) devices, where the incoming destination address and source address can be compared to a table of previously stored addresses simultaneously. This makes the present invention capable of comparing large numbers of addresses in real time. As an alternative to the CAM devices. A memory array (48-bits wide) could be used, but the sequential search time would limit the number of addresses that could be compared before the end of the packet is reached.

The present invention is intended to be used in a bridge requiring the characteristics of transparent bridging, wherein the existence and interconnection of a plurality of LANs is not apparent or is otherwise transparent to the user. This could be a bridge devoted to transparent bridging, or a bridge that combines transparent bridging with source routing. The present invention can also be used in a mode to provide specific destination address filtering if the source address learning is turned off and the address table is filled by the host microprocessor.

The present invention is described in the specification in an IEEE 802.5 Mbps Token Ring environment and an IEEE 802.3 Ethernet 10base5, 10base2 and 10baseT environment. It could be implemented in an IEEE 16 Mbps 802.5 Token Ring environment or a 100 Mbps FDDI environment. The invention. However is not limited to these type LANs, and can be applied to any LAN that uses packet formats similar to the IEEE specifications.

Appendix A is a listing of Boolean equations and state machine description language utilized for carrying out the apparatus and method of the present invention.

DETAILED DESCRIPTION OF THE PREFERRED EMBODIMENT

Figure 1:
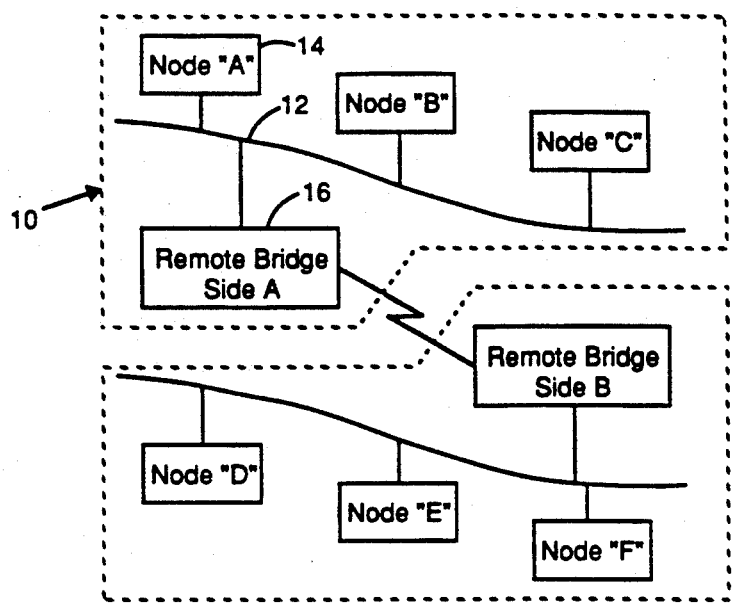
FIG. 1 is a block diagram of a representative portion of two LANs with a remote bridge providing connectivity between them.

Referring now to FIG. 1, in LAN 10, a medium 12 interconnects a number of nodes 14 to facilitate digital communication among them. Nodes may be server devices for one or more data terminals (DTEs), computers, etc. Different nodes can represent equipment supplied by different vendors, but all nodes communicate via the LAN medium in accordance a packet type protocol.

Occasionally, it is necessary for nodes to communicate with other nodes not directly connected to the LAN medium. Of the several methods to accomplish this connection, a transparent bridge 16 is shown in FIG. 1. The invention can be applied to this type of bridge, whether remote (connected to another bridge via a Wide Area Network link) of a local (co-located in the same chassis) and can also be used in conjunction with the Token Ring Source Routing protocol.

Figure 2A:
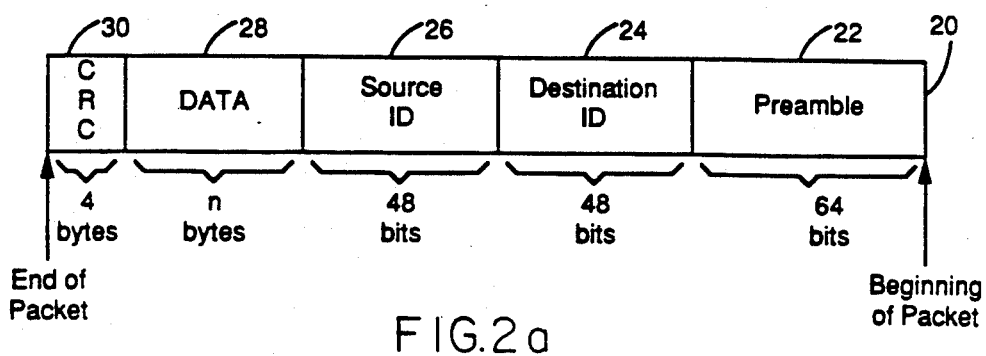
FIG. 2a is a diagram of a known Ethernet/IEEE 802.3 packet structure.

Referring now to FIG. 2a, representing an Ethernet data packet, each data packet 20 begins with a preamble 22 of 64 bits consisting of alternating 1s and 0s and ending with two consecutive 1s. Next a sequence of forty eight destination ID bits 24 identify the node for which the packet is intended, and a sequence of 48 source ID bits 26 identify the node which originated the packet. The n bytes of data 28 appear followed by four CRC bytes 30 at the end of the packet. The structure of the Ethernet packet described herein is not a part of the present invention, but is a data packet which is described and specified by IEEE Recommendation 802.3.

Figure 2B:
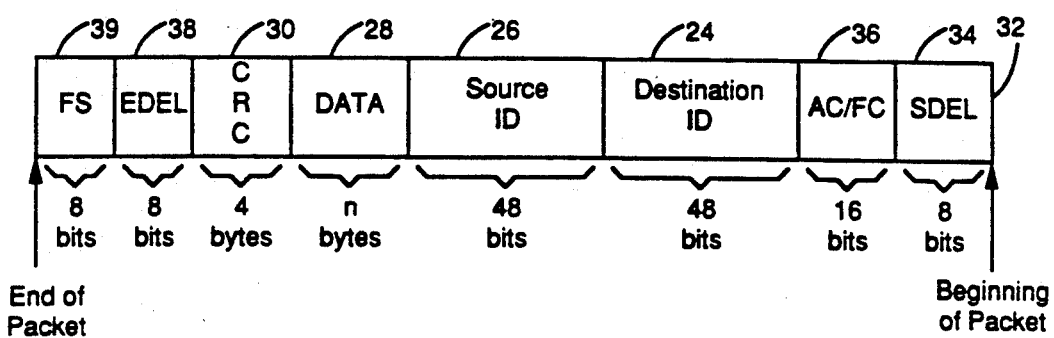
FIG. 2b is a diagram of a known Token Ring/IEEE 802.5 packet structure.

Referring now to FIG. 2b, representing a Token Ring data packet, each data packet 32 begins with a Starting Delimiter 34 of 1 byte comprised of Manchester code violations. Manchester encoding is a known method to encode serial data and is specified in the IEEE publication referred to above on page 73. Next, a sequence of two bytes comprises the Access Control/Frame Control fields 36. Then a sequence of forty eight destination ID bits 26 identify the node which originated the packet. The n bytes of data 28 appear followed by four CRC bytes 30 at the end of the packet. The packet is closed by an Ending Delimiter 38 of 1 byte comprised of a different Manchester code violation than the Starting Delimiter 34. Following the Ending Demlimiter 38 and outside the CRC 30 is the Frame Status Field 39 containing the Address Recognized/Frame Copied bits. The node on the LAN can determine by the setting of Frame Status Field 39 whether the destination node is located on the LAN and whether the message was received. The functioning and structure of the Frame Status Field 39 is detailed in the IEEE publication referred to above, at pages 34–35.

The structure of the Token Ring packet described herein is not a part of the present invention, but is rather a structure which is specified and described by IEEE Recommendation 802.5, contained in the IEEE publication referred to above. These Address Recognized/Frame Copied bits convey to the sending node whether or not the destination ID 24 was recognized by a node on the LAN and whether or not the receiving node copied the frame into its memory. The decision as to how these bits are to be set must be rendered before the end of the packet is relayed through the LAN controller IC.

Figure 3:
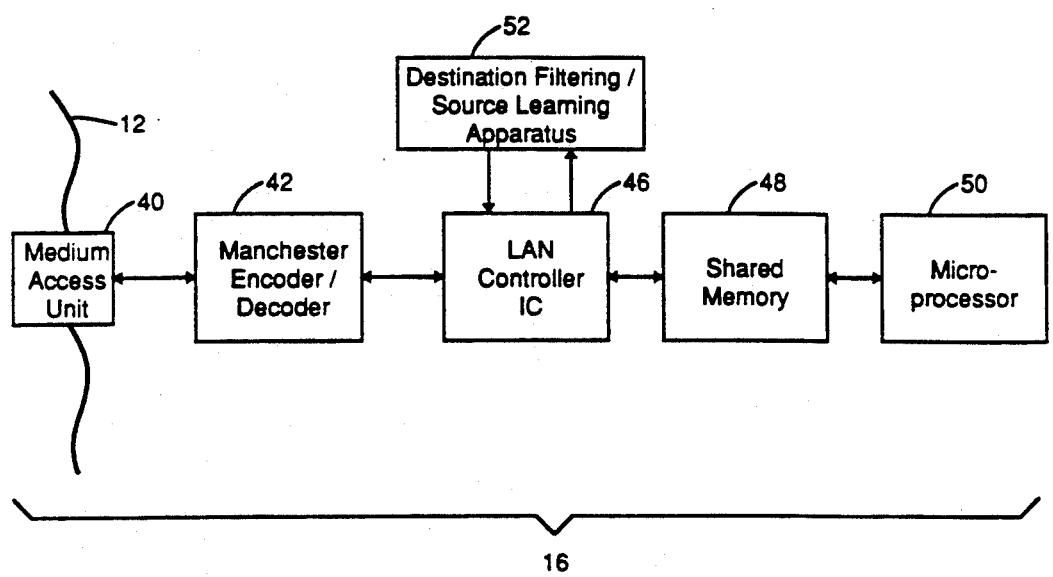
FIG. 3 is a block diagram of a LAN bridge station.

Referring now to FIG. 3, the transparent bridge denoted as 16 contains a medium access unit 40 that receives all digital data signals that appear on the LAN medium and transmits onto the medium digital data signals that are generated from the bridge. Digital data signals are carried on the medium 12 in Manchester encoded form. Medium access unit 40 is connected to a Manchester encoder/decoder 42 that decodes the encoded digital data received from the medium access unit 40 into a stream of non Manchester encoded data and Manchester encodes streams of non Manchester encoded data generated by the node for delivery to the medium access unit 40. A commercially available integrated circuit available for purposes of providing the functioning of the Manchester encoder described herein is an AMD 7992 device, available from Advanced Micro Devices.

The Manchester Encoder/Decoder determines that there is signaling on the LAN medium. When it begins decoding the signal, it conveys the decoded data and clock to the LAN Controller 46 LAN Controller 46 may be a commercially available integrated circuit, such as the AMD 7900, available from Advanced Micro Devices. In the absence of the present invention, all packets received by the LAN controller 46 will be placed in the shared memory 48, requiring the microprocessor 50 to allot valuable time to looking at each packet and determining whether it should pass it along to the remote bridge or discard the packet. In addition, and again in the absence of the present invention, in some Token Ring applications the low level packet protocol will be violated because the Address Recognized/Frame Copied bits in the Frame Status Field 39 could not be set while the packet was passing through the LAN Controller.

Figure 4:
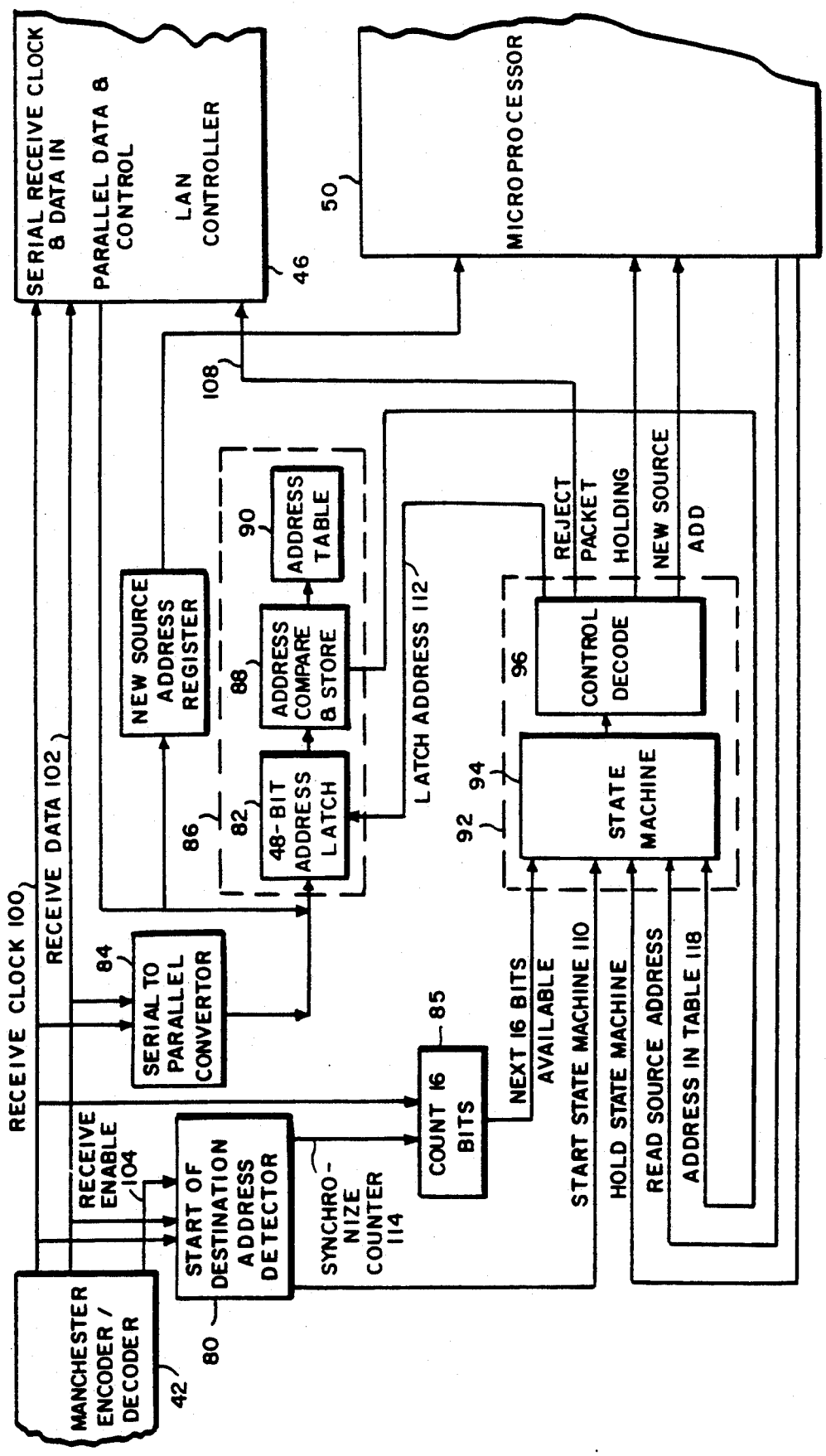
FIG. 4 is a block diagram of the LAN source address learning/destination address filtering apparatus.

Referring now to FIG. 4, the invention facilitates two methods to interface with the data stream being received from the LAN: (1) a serial path using the Receive Clock 100 and Receive Data 102 signals that connect the Manchester encoder/decoder and the Ethernet LAN controller chip (for Ethernet/802.3 applications); and (2) a parallel path that allows the invention to take data directly from the Token Ring Controller chip parallel bus 104 after the Manchester encoder/decoder and the internal LAN Controller serial to parallel conversion (for Token Ring/802.5 applications)

Figure 7:
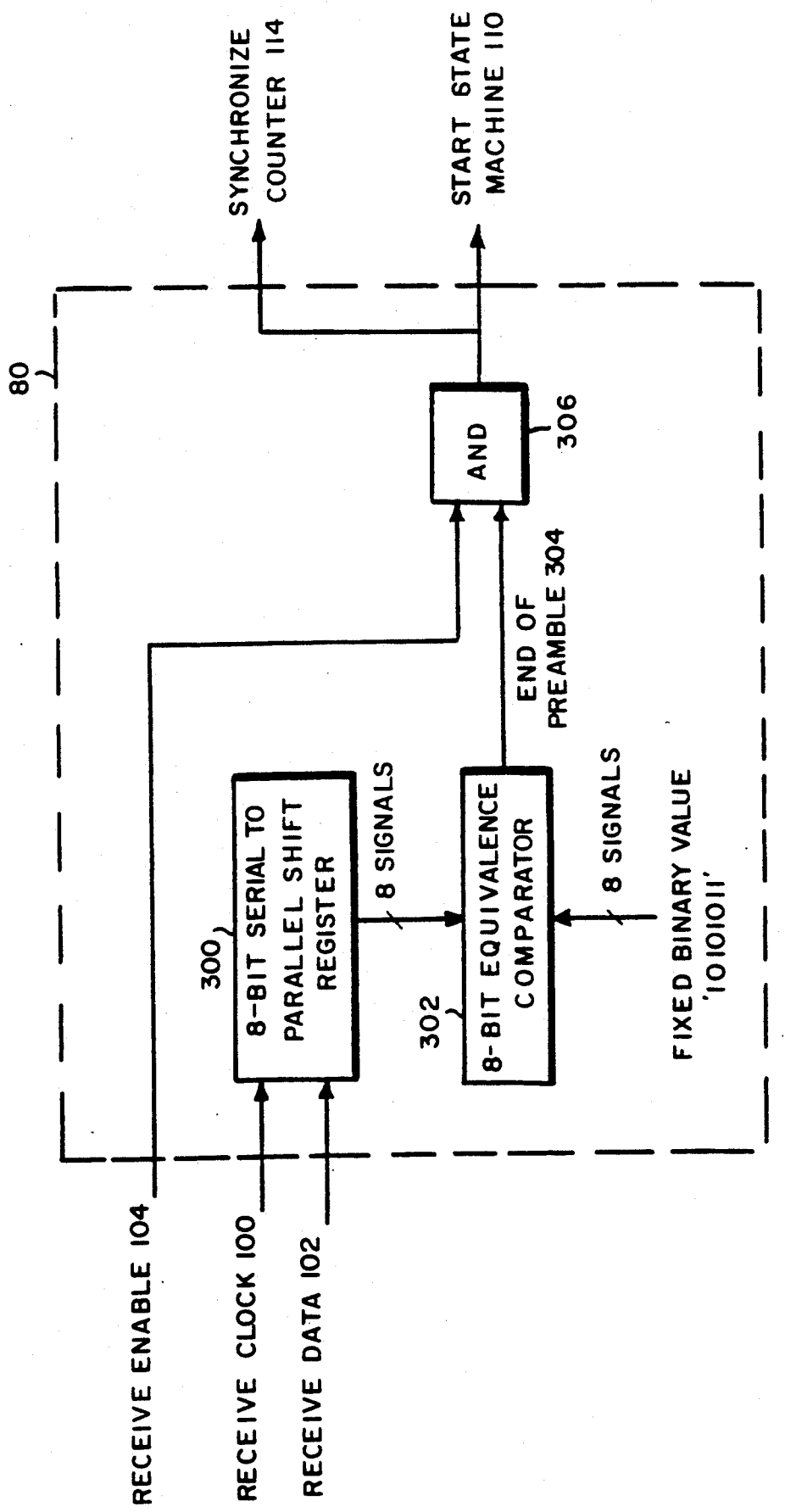
FIG. 7 is a schematic diagram of the start of destination address detector shown in FIG. 4.

In the case of an Ethernet LAN, a separate circuit 80 looks for the Ethernet preamble 22. The Ethernet preamble consists of 64 bits of alternating ones and zeroes, the end of which is designated by two consecutive ones (illustrated by the binary octet '10101011') The Start of Destination Address Detector 80, shown in FIG. 4 and in detail in FIG. 7, uses a serial to parallel shift register 300 with the receive data 102 signal feeding the serial input and the receive clock 100 continuously clocking the data through shift register 300. Any time the parallel output of the shift register 300 matches the fixed binary pattern 10101011 (the end of-preamble octet described and specified in the IEEE 802.3 specification) of the 8 bit equivalence comparator 302, an end of preamble signal 304 is asserted. This signal 304 is "ANDed" with the receive enable signal 104 at 306 such that the Start State Machine signal 110 and the Synchronize Counter signal 114 will assert only when a packet is being received.

The circuit 80 generates a signal 114 that synchronizes the serial to parallel shift register 84 to the incoming data stream. A counter 85 is started at this time to determine when 16-bits of the destination ID have been serially shifted. At the end of 16 bits the counter signals the state machine 94 that the parallel registers can be "dumped" to the 48-bit address latch 82 within the content addressable memory 86. This 48-bit latch within the content addressable memory chip has to be loaded in three consecutive 16-bit operations. In the remainder of the description of the present invention, the operation of the invention is the same for Ethernet and Token Ring The serial to parallel shifting and synchronization are done independently of the state machine, so that the state machine does not need to know which type of LAN (Ethernet or Token Ring) it is operating on.

In the case of a Token Ring LAN, the Start of Destination Address Detector 80, the Serial to Parallel Convertor 84, and the 16 bit Counter 85 are contained within the Token Ring Chip set commercially available from Texas Instruments (as TMS380). The TMS380 presents a parallel bus that contains the information to operate the state machine.

The state machine 92 controls the address storage latches 82 with the latch address signal 112. The state machine referred to generally in FIG. 4 as 92 actually is a representation of a state machine 94 and a control decode 96, described in detail below with reference to FIG. 6. When a complete address is latched into the address storage latches 82 of the content addressable memories 86, the content addressable memories automatically begin a table comparison process. One content addressable memory will simultaneously compare 256 48-bit data string (in this case LAN addresses) and report the result as a match (if the comparing string is found in at least one of the 256 locations) or a no match (if the comparing string is not found in any of the 256 locations). One embodiment of the present invention allows for up to eight content addressable memories to be used in parallel operation for a total of up to 2048 (256 times 8) 48 bit LAN addresses. Addresses can be stored in the content addressable memories by one of two methods: (1) the microprocessor 50 (which may be a M68000 series microprocessor available from Motorola) can directly enter the LAN addresses (which can be either learned from packets received or from a predetermined table entered by a user of the LAN bridge), or (2), the state machine can learn the source addresses 26 from the incoming packets as described below. When a comparison to the address table 90 is completed, the address compare and store logic 88 signals the state machine 92 with the address-in-table 118 signal. The state machine 92 signals the LAN controller to discard a packet by asserting the reject packet 108 signal. In the case of an Ethernet LAN, this signal is "ORed" with the collision signal from the Medium Access Unit 40, to force the Ethernet LAN Controller 46 to discard the packet. In the case of Token Ring, this signal is connected to the XFAIL signal of the Token Ring Chip set (Texas Instruments TMS380), and its inverse is connected to the XMATCH signal. The assertion of XFAIL will cause the Token Ring Chip set to discard the packet unless the packet is determined by the Token Ring Chip set to be addressed to the bridge directly.

Figure 5:
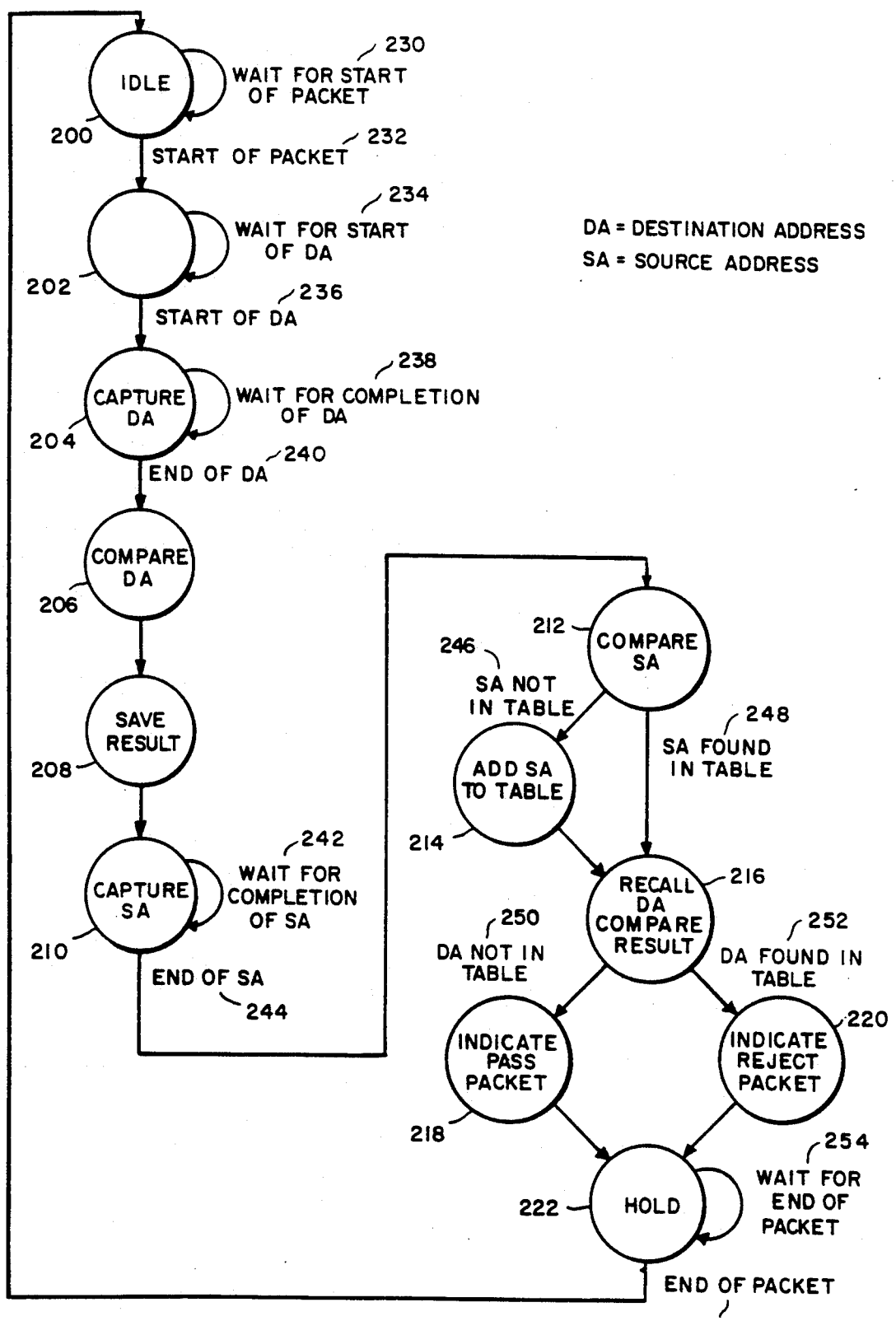
FIG. 5 is a flow diagram of the LAN source address learning/destination address filtering apparatus state machine.

Referring now to FIGS. 4 and 5, when no packets are being received from the Manchester encoder/decoder 42, the state machine is idle at step 200. The state machine remains idling while waiting for the start of the packet at 230. As soon as the start of a packet is indicated to the apparatus of FIG. 4 at step 232, the start of destination address detector 80 begins looking for the destination ID 24 (shown in FIGS. 2a and 2b) in the data and the state machine waits at 202 for an indication of the start of the destination address at 234. When the destination address detector 80 determines that the destination ID 24 is about to start, the detector 80 signals this to the state machine 92 by asserting the start state machine signal 110 at 236. This places the state machine 92 in the capture destination address mode at step 204.

The state machine 92 then captures the destination ID 24 in the address storage latches 82. After the destination ID 24 is captured completely at 238 and completely stored at 240, the content addressable memories 86 compare at step 206 the destination ID 24 with the address table 90 of previously stored source IDs 26 (shown in FIGS. 2a and 2b). At the present time content addressable memories are available commercially, such as the AMD 99C10 integrated circuit available from Advanced Micro Devices, in size of 256 address capacity. These CAMs may be ganged together to allow 512, 1024, etc. of addressable memory. The destination ID comparison is completed before the source ID is captured. The result of the comparison is conveyed to the state machine by the address in table signal 118. The state of this signal is stored in step 208 by the state machine 92. After the comparison of the destination ID 24, the state machine enters the capture source destination mode in step 210. When the complete source ID 26 is captured in 242 and completed at 244, the state machine 92 causes the content addressable memories to compare in step 212 the stored source ID 26 to the address table 90 of previously stored source IDs. When the comparison is complete, the state machine 92 checks the state of the address-in-table signal 118. If this signal is active such that the source address is found in the table, then the address has been stored previously as denoted at 248. If this signal is not active such that the source address is not in the table at 246, then the state machine will enter the new source ID into the address table 90 by sequencing through the add source address to table mode in step 214. The stored state of the address in table signal 118, in step 216 is then used to signal to the LAN controller to either reject the packet at 220 if the destination address is found in the table at 252 using the reject packet signal 108 or pass the packet to the microprocessor in step 218 if the destination address is not found in the table denoted at 250. In the case of Ethernet, this signal is "ORed" with the collision signal from the Medium Access Unit 40 to force the Ethernet LAN Controller 46 to discard the packet. In the case of Token Ring, signal 108 is connected to the XFAIL signal of the Token Ring Chip set (Texas Instruments TMS380), and its inverse is connected to the XMATCH signal. The assertion of XFAIL will cause the Token Ring Chip set to discard the packet unless the packet is determined by the Token Ring Chip set to be addressed to the bridge directly. The state machine then enters the wait for end of packet mode denoted at 254 and waits for the end of the packet at 256 in step 222 before returning to the idle state in step 200.

Figure 6:
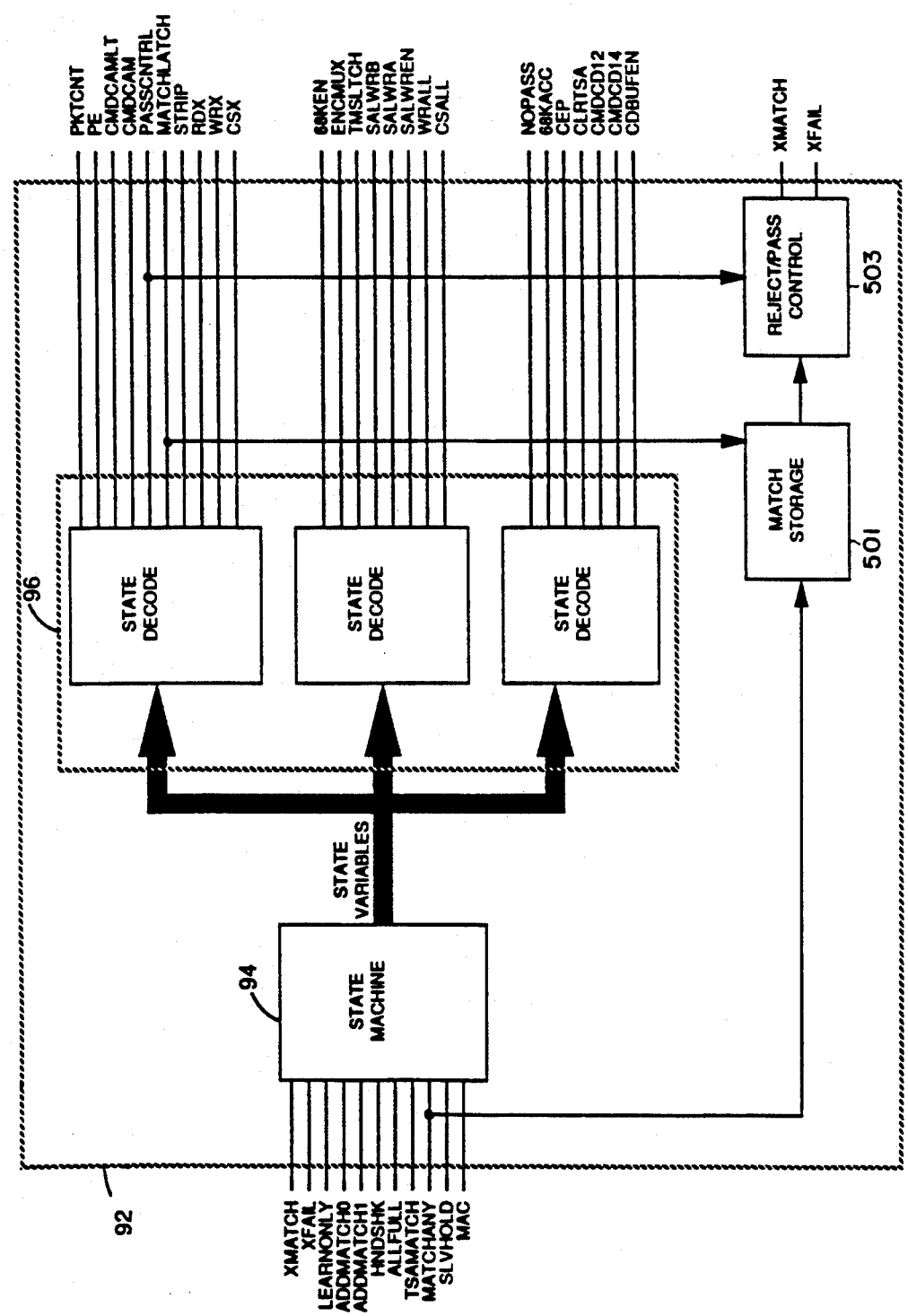
FIG. 6 is an exploded view of the state machine used to implement the embodiment of FIG. 5 showing all sampled inputs and controlled outputs.

Referring now to FIG. 6, the implementation of the Token Ring version of FIG. 5 uses groups of signals that are represented as a single signal in FIG. 5. In FIG. 6, it is seen that the state machine 92 corresponds to the state machine 92 of FIG. 4, and is comprised of the state machine 94, and state decode 96, which may be, as noted above, programmable logic arrays. The meaning and significance of the various signals represented in FIG. 6 are given by the Table below:

| TABLE OF SIGNAL NAME ABBREVIATIONS FOR FIG. 6 | | |
| --- | --- | --- |
| PKTCNT | PacKet CouNT | Increments a 16-bit counter to keep track of packets received from the LAN |
| PE | Parallel load Enable | Allows the address on the Token Ring Chip set address/data bus to be latched into a set of incrementing counters. |
| CMDCAMLT | CoMmanD CAM LaTch | When the CAM command register is read this signal will latch the address of the first empty CAM location. |
| CMDCAM | CoMmanD CAM | This signal enables a CAM command to be written to the CAM control register. |
| PASS-CNTRL | PASSCoNTRoL | This signal asserts near the end of the state machine cycle to cause the LAN controller chip to pass or reject the current packet. |
| MATCH- | MATCH LATCH | This signal latches the state |

-continued

TABLE OF SIGNAL NAME ABBREVIATIONS FOR FIG. 6

| | | |
|---|---|---|
| LATCH | | of the "ANDed" MATCH signals from the CAMs after the CAMs have been loaded with the destination address. |
| STRIP | STRIP | This signal is used when the state machine detects an automatic reject, such as a Token Ring MAC level frame. |
| RDS | Read one CAM | This signal is used to single out a single CAM in a multiple CAM system to be read from. |
| WRX | Write one CAM | This signal is used to single out a single CAM in a multiple CAM system to be written to. |
| CSX | Chip Select one CAM | This signal is used to single out a single CAM in a multiple CAM system to be read or written. |
| 68KEN | 68K ENable | This signal is asserted in response to a SLVHOLD signal assertion when the state machine is in the idle state and the microprocessor requests access to the CAMS. |
| ENCMUX | ENCode MUtipleXer | This signal latches the number of the CAM (in a multiple CAM system) where a newly learned source address has been stored. |
| TMSLTCH | TM380 LaTCH | This signal is synchronized with the demultiplexing of the Token Ring Chip set address/data bus. |
| SALWRA SALWRB | Source Address Learned WRite A/B | These signals control the addressing of a set of register files that store the newly learned 48-bit source address. |
| SALWREN | Source Address Learned ENable | This signal controls the writing of the newly learned 48-bit source address to a set of register files, that can subsequently be read by the microprocessor. |
| WRALL CSALL | WRite ALL Chip Select ALL | These signals are asserted to cause a simultaneous write to all of the CAMS. They are used to write the source and destination addresses to all of the CAMs (in a multiple CAM system) at the same time. |
| NOPASS | NO PASS | This signal has an identical function to STRIP. |
| 68KACC | 68K ACCess | This signal has an identical function to 68KEN. |
| CEP | Count Enable Parallel | This signal allows the 16-bit counter that contains the address latched from the Token Ring Chip set address/data bus (by the signal PE described above) to increment to the next sequential address, which will indicate where the next received 16-bits of the incoming packet will be stored by the Token Ring Chip set. |
| CLRTSA | CLeaR Transmit Strip | This signal clears the register that holds the source address of a packet that the Token Ring Chip set has queued for transmit. This prevents the state machine from learning a packet sent |

-continued

TABLE OF SIGNAL NAME ABBREVIATIONS FOR FIG. 6

| | | |
|---|---|---|
| | | around the ring by this node (the bridge). |
| CMDCD12 CMDCD14 | CoMmand CAM Data bit 12/14 | These signals are used to change bits on the data bus (through an octal buffer controlled by the CMDCAM signal described above) when the state machine needs to reset the CAM segment counter bits or needs to write the source address into the CAM memory or the microprocessor data bus buffers have access to the CAM data bus. |
| CDBUFEN | CAM Data bus BUFfer ENable | |
| XMATCH | eXternal MATCH | This signal is bi-directional from the Token Ring Chip set. As an input, when both it and the XFAIL lines are active, the chip set is signalling the beginning of a new receive packet. As an output, it indicates to the chip set that it should pass the packet to the microprocessor. |
| XFAIL | eXternal FAIL | This signal is bi-directional from the Token Ring Chip set. As an input, when both it and the XMATCH lines are active, the chip set is signalling the beginning of a new receive packet. As an output, it indicates to the chip set that it should reject the packet currently being received, without informing the microprocessor. |
| LEARN-ONLY | LEARN ONLY | This signal is set by the microprocessor to allow the state machine to learn the source addresses of incoming packets and reject them regardless of the destination address. |
| ADD-MATCH0 ADD-MATCH1 | ADDress MATCH 0/1 | These signals are the equivalence outputs of standard octal comparators that compare the current address on the Token Ring chip set bus with the stored and incremented address latched by the PE signal (described above). |
| HNDSHK | HaNDSHake | This signal indicates to the state machine that the microprocessor has read the previously learned source address. If this bit is not active, then the state machine will proceed to learn a new source address. If this bit is active, then the state machine will not learn any other source addresses, but it will still filter based on the destination address. |
| ALLFULL | ALL FULL | This signal indicates that the CAM(s) are full and that no more new source addresses can be stored in the CAM(s). |
| TSAMATCH | Transmit Strip Address MATCH | This signal is the equivalence output of a standard comparator that compares the packet currently being received with the source address of the packet most recently transmitted. This prevents the state machine from learning the source address of the packet it just transmitted. |

-continued
TABLE OF SIGNAL NAME ABBREVIATIONS FOR FIG. 6

| | | |
|---|---|---|
| MATCHANY | MATCH ANY | This signal is the "ORed" signal of all of the CAMs MATCH signals that indicate that a match for the destination or the source address was found one of the CAMs. |
| SLVHOLD | SLaVe HOLD | This signal is a request from the microprocessor to place the state machine in a "holding" loop so that the microprocessor can access the CAMs without interruption. |
| MAC | MAC | This signal is generated when the AC/FC portion of the Token Ring packet is present on the Token Ring Chip set data bus. It is used by the state machine to reject MAC frames. |

In operation, the Start of Packet 230 is signified to the state machine 94 when both XFAIL and XMATCH are asserted. The state decoder 96 de-asserts PE and asserts CEP to capture the TMS380 bus address of the packet as it is being stored to memory. The state machine then enters the Wait for Destination Address loop in step 202. When the next sequential address appears on the TMS3870 memory bus, the two signal ADDMATCH0 and ADDMATCH1 will assert. The state decoder asserts WRALL to the content addressable memory(ies) so they can latch a 16 bit piece of the 48 bit destination address. Then CEP is asserted to allow the next sequential TMS380 memory address to be located. This cycle occurs two more times, allowing the capture of all 48 bits of the destination address.

After the third write to the content addressable memory(ies) they will automatically begin the Compare Destination Address cycle in step 206. Then the state machine will advance to the Save Result cycle in step 208 and the state decode will assert the MATCHLATCH signal to take a snapshot of the result of the comparison and write that result to a storage element 501 for later use. MATCHLATCH is used as the clock input to a D type flip flop, the standard storage element denoted at 501 as MATCH STORAGE. The MATCHANY signal, also known as the Address in Table denoted at 118 in FIG. 4, will be asserted by any content addressable memory that locates the 48-bit destination address in its table. The MATCHANY signal is used as the "D" (or data) input to the storage element or flip flop 501. The "Q" or output of the element or flip-flop 501 is sent to the Reject/Pass control element or decoder 503.

The state machine checks the state of the ALLFULL signal to determine if there is space available in any of the content addressable memory(ies) in the case the source address (which will be captured next) needs to be stored in the content addressable memory. It also checks the HNDSHK signal to determine if the microprocessor 50 has read a previously learned source address. If either of these signals is asserted then the state machine skips the source address portion of the state machine (in steps 210, 212 and 214) and proceeds to recall the result of the Destination Address comparison 216.

If both ALLFULL and HNDSHK are de asserted, the state machine continues to look for data being stored in sequential memory locations on the TMS380 memory bus. It captures the three 16 bit pieces of the Source Address in the content addressable memory(ies) address latch by asserting WRALL and CEP in the same manner as described previously. The state decode also asserts SALWRA, SALWRB, and SALWREN to capture the source address to a 48-bit register that can be read by the microprocessor if the address is added to the content addressable memory address table 90. When the 48-bit address is complete, the content addressable memory(ies) automatically compare the address to the addresses previously stored in the address table 90 (as internal structure of the content addressable memory). The state machine advances to the Compare Source Address cycle in step 212.

If the content addressable memory(ies) finds a match, the MATCHANY signal will be asserted to the state machine 94 and to the storage latch 501 denoted as MATCH STORAGE in FIG. 6 for later use. This signal is coupled with the TSAMATCH signal which, if asserted, will indicate that this packet currently being received was transmitted by this bridge (in a ring, the transmitter will receive all packets that it transmits and is responsible to strip off its transmitted packet so that it does not continue around the ring indefinitely). The TSAMATCH signal is created by comparing the received source address to the last queued transmit address read from the TMS380 memory bus. If the TSAMATCH signal is asserted, then the state machine does not learn the received source address (if it did learn the address of a packet that came from another LAN via this bridge, then packets originated by local nodes destined for this address will be filtered in the future, thereby defeating the bridging function, since the learned address table is used for filtering destination addresses).

If the source address is to be added to the table, then the state machine enters the Add Source Address To Table cycle in step 214 and the state decode asserts RDX, WRX, and CSX to the content addressable memory with an empty location (determined by the individual FULL signals supplied by the content addressable memory fed through a priority encoder such as the TTL chip 74147). First the content addressable memory is read with the RDX and CSX signals. The first available location is from the status register of the content addressable memory into an 8-bit register using the CMDCAMLT signal (this address indicates one of 256 memory locations). Then a command is issued to the content addressable memory by asserting the WRX, CSX, CMDCAM, and CMDCD12 signals. The state machine then advances to the Recall Destination Address Compare Result cycle in step 216.

This group of signals consists of PASSCNTRL, STRIP, and NOPASS. All three signals control a decoder 503 denoted as REJECT/PASS CONTROL in FIG. 6 to enable either XMATCH or XFAIL (which have been held in a high impedance state). If PASSCNTRL is asserted, then the decoder 503 looks at the state of the signal stored by the signal MATCHLATCH back in the Save Result cycle 208. If this signal is asserted, then a match was found in the content addressable memory indicating that the address was learned from a local node. In this case, since filtering is based on the destination address, the packet currently being received is destined for a local node and should not be passed to the microprocessor 50 and XFAIL will be asserted. If the latched signal is de asserted, then this packet is bound for a non local destination and should be passed to the microprocessor and XMATCH will be asserted. If STRIP is asserted, then the state machine is in the idle/hold state and the microprocessor is accessing the content addressable memory(ies) (68KEN and 68KACC will also be asserted by the state decode). In this case all packets are to be discarded and XFAIL will be asserted. If NOPASS is asserted, then the state machine has been placed in a mode where is only learning addresses on the local ring. This is controlled by a signal to the state machine from the microprocessor called LEARN ONLY. If this signal is asserted, then NOPASS will be asserted, which will cause XFAIL to be asserted. Then the state machine will advance to Wait For End of Packet 254, and assert the packet counter signal, PCKCNT, that allows the microprocessor to keep track of the number of packets, whether they are filtered or not.

This state machine is the same for the Ethernet case, except that the signals have somewhat different names, corresponding to the way they are produced. XMATCH and XFAIL as inputs to the state machine are combined into a single signal called RENA (for Receive ENAble). As outputs from the external decoder 503 XMATCH and XFAIL are also combined to a single signal, called CLSN EN (for CoLiSioN ENable). The ADDMATCH0 and ADDMATCH1 signals are combined into COUNT 16 signal, which indicates that the next 16-bits of a destination or source address are available. There is no TSAMATCH signal since in Ethernet the transmitter does not need to strip its transmitted packet.

With respect to the state decode 96, only the signals PE and CEP are not used. All other signals operate in the same manner as for the Token Ring.

The system of the present invention has been described above as being applicable to the interfacing of LANs of the Ethernet type and of the Token Ring type. The system could also be used with the interfacing of other types of LANs, such as the types described in detail in the publication *Understanding Local Area Networks* referred to above.

Therefore, while the foregoing invention has been described with reference to its preferred embodiment, various alterations and modifications will occur to those skilled in the art. All such modifications and alterations are intended to fall within the scope of the appended claims.

```
Name         lafsU1r;
Partno       27-260-3;
Assembly     LAFS;
Date         06/23/89;
Revision     2.1;
Designer     g.b. videlock/d. nadrowski;
Company      microcom, inc;
Location     U1;
Device       p22v10;

/********************************************************************/
/*   Allowable Target Device Types:    22v10-15                     */
/********************************************************************/

/**   Inputs   **/

Pin 1     =  lclk       ;
Pin 2     =  !xmatch    ;
Pin 3     =  !xfail     ;
Pin 4     =  learnonly  ;
PIN 5     =  !addmatch0 ;
Pin 6     =  !addmatch1 ;
Pin 7     =  !hndshk    ;
Pin 8     =  !allfull   ;
Pin 9     =  !tsamatch  ;
Pin 10    =  !matchany  ;
Pin 11    =   slvhold   ;   /* active high to match spec */
Pin 13    =  !mac       ;

/**   Outputs  **/

Pin 23    =  !q1        ;   /* STA */
Pin 22    =  !q6        ;   /* STB */
Pin 21    =  !q9        ;   /* STC */
Pin 20    =  !q2        ;   /* STD */
Pin 19    =  !q0        ;   /* STE */
Pin 18    =  !q5        ;   /* STF */
Pin 17    =  !q4        ;   /* STG */
Pin 16    =  !q3        ;   /* STH */
Pin 15    =  !q8        ;   /* STJ */
Pin 14    =  !q7        ;   /* STK */

/**  Declarations and Intermediate Variable Definitions **/

$define and     &
$define or      #
$define ON      'b'1
$define off     'b'0
```

FIELD st = [q9..0];

```
$define s0    'b'0000000000
$define s1    'b'0000000001
$define s1a   'b'0000010001   /*rst seg cnt 'B0XX'*/
$define s1b   'b'0000010101
$define s2    'b'1000000000   /* addmatch */
$define s3    'b'1000000010
$define s4    'b'1000000011
$define s5    'b'1001000000   /* addmatch */
$define s6    'b'1000000100
$define s7    'b'1000000101
$define s8    'b'1010000000   /* addmatch */
$define s9    'b'1000001000
$define s10   'b'1000001100
$define s11   'b'1000001010
$define s12   'b'1011000000   /* addmatch */
$define s13   'b'1000010000
$define s14   'b'10--10001
$define s15   'b'11--00000    /* addmatch */
$define s16   'b'1000010100
$define s17   'b'1000011100
$define s18   'b'1101000000   /* addmatch */
$define s19   'b'1000100000
$define s20   'b'1000000001
$define s21   'b'0000000011
$define s22   'b'0000100010
$define s23   'b'0000100110
$define s24   'b'0000100111
$define s25   'b'0000100101
$define s25a  'b'0000100000
$define s25b  'b'0000100001
$define s25c  'b'0000100100
$define s26   'b'1000100100
$define s27   'b'1110000000   /* addmatch */
$define s28   'b'1000101000
$define s29   'b'1000101100
$define s30   'b'1111000000   /* addmatch */
$define s31   'b'1000101010
$define s32   'b'1000000111
$define s33   'b'0000101000
$define s34   'b'0000001000
$define s35   'b'0000001100
$define s36   'b'0000110000
$define s37   'b'0000110001
$define s38   'b'0010000000   /* new addmatch */
$define s39   'b'0000110100
$define s40   'b'0001000000   /* new addmatch */
```

/ Logic Equations /

```
q0.ar = learnonly and slvhold;
q1.ar = learnonly and slvhold;
q2.ar = learnonly and slvhold;
q3.ar = learnonly and slvhold;
q4.ar = learnonly and slvhold;
q5.ar = learnonly and slvhold;
q6.ar = learnonly and slvhold;
q7.ar = learnonly and slvhold;
q8.ar = learnonly and slvhold;
q9.ar = learnonly and slvhold;
q0.sp = off;
q1.sp = off;
q2.sp = off;
q3.sp = off;
q4.sp = off;
q5.sp = off;
q6.sp = off;
q7.sp = off;
q8.sp = off;
q9.sp = off;

sequence st {
```

```
present s0
        if xmatch & xfail                      next s1;
        if slvhold                             next s36;
        default                                next s0;

present s1
        if mac                                 next s40;
        default                                next s1a;

present s1a
        default                                next s1b;

present s1b
        default                                next s2;

present s2
        if !addmatch0 or !addmatch1            next s2;
        default                                next s3;

present s3
                                               next s4;

present s4
                                               next s5;

present s5
        if !addmatch0 or !addmatch1            next s5;
        default                                next s6;

present s6
                                               next s7;

present s7
                                               next s8;

present s8
        if !addmatch0 or !addmatch1            next s8;
        default                                next s9;

present s9
                                               next s10;

present s10
                                               next s11;

present s11
        if allfull or hndshk                   next s33;
        default                                next s12;

present s12
        if !addmatch0 or !addmatch1            next s12;
        default                                next s13;

present s13
        if tsamatch                            next s26;
        default                                next s14;

present s14
                                               next s15;

present s15
        if !addmatch0 or !addmatch1            next s15;
        default                                next s16;

present s16
                                               next s17;

present s17
                                               next s18;

present s18
        if !addmatch0 or !addmatch1            next s18;
        default                                next s19;

present s19
                                               next s20;
```

```
present s20
                                                    next s21;

present s21
        if matchany                                 next s33;
        default                                     next s22;

present s22
                                                    next s23;

present s23
                                                    next s24;

present s24
                                                    next s25;

present s25
                                                    next s25a;

present s25a
                                                    next s25b;

present s25b
                                                    next s25c;

present s25c
                                                    next s33;

present s26
                                                    next s27;

present s27
        if !addmatch0 or !addmatch1                 next s27;
        default                                     next s28;

present s28
        if !tsamatch                                next s17;
        default                                     next s29;

present s29
                                                    next s30;

present s30
        if !addmatch0 or !addmatch1                 next s30;
        default                                     next s31;

present s31
        if !tsamatch                                next s20;
        default                                     next s32;

present s32
                                                    next s35;

present s33
        if learnonly                                next s35;
        default                                     next s34;

present s34
                                                    next s0;

present s35
                                                    next s0;

present s36
        if !slvhold and (!xmatch or !xfail)         next s0;
        if  xmatch and xfail                        next s37;
        default                                     next s36;

present s37
        default                                     next s38;

present s38
        if !addmatch0 or !addmatch1                 next s38;
        default                                     next s39;

present s39
                                                    next s36;
```

```
present s40
       if !addmatch0 or !addmatch1          next s40;
       default                              next s35;
}

/******************************************************************/
/*  Allowable Target Device Types:  20L10-25                      */
/******************************************************************/

/**   Inputs   **/

Pin 1      =   lclk      ;
Pin 2      =   !q1       ;   /* STA */
Pin 3      =   !q6       ;   /* STB */
Pin 4      =   !q9       ;   /* STC */
Pin 5      =   !q2       ;   /* STD */
Pin 6      =   !q0       ;   /* STE */
Pin 7      =   !q5       ;   /* STF */
Pin 8      =   !q4       ;   /* STG */
Pin 9      =   !q3       ;   /* STH */
Pin 10     =   !q8       ;   /* STJ */
Pin 11     =   !q7       ;   /* STK */

/**   Outputs   **/

Pin 14     =   !pckcnt      ;
Pin 15     =   !pe          ;
Pin 16     =   cmdcamlt     ;
Pin 17     =   !cmdcam      ;
Pin 18     =   !passcntrl   ;
Pin 19     =   !matchlatch  ;
Pin 20     =   !strip       ;
Pin 21     =   !rdx         ;
Pin 22     =   !wrx         ;
Pin 23     =   !csx         ;

/** Declarations and Intermediate Variable Definitions **/

$define and     &
$define or      #
$define ON      'b'1
$define off     'b'0

FIELD st = [q9..0];

$define s0       'b'0000000000
$define s1       'b'0000000001
$define s1a      'b'0000010001   /* rst seg cnt */
$define s1b      'b'0000010101
$define s2       'b'1000000000   /* addmatch */
$define s3       'b'1000000010
$define s4       'b'1000000011
$define s5       'b'1001000000   /* addmatch */
$define s6       'b'1000000100
$define s7       'b'1000000101
$define s8       'b'1010000000   /* addmatch */
$define s9       'b'1000001000
$define s10      'b'1000001100
$define s11      'b'1000001010
$define s12      'b'1011000000   /* addmatch */
$define s13      'b'1000010000
$define s14      'b'1000010001
$define s15      'b'1100000000   /* addmatch */
$define s16      'b'1000010100
$define s17      'b'1000011100
$define s18      'b'1101000000   /* addmatch */
$define s19      'b'1000100000
$define s20      'b'1000000001
$define s21      'b'0000100011
$define s22      'b'0000100010
$define s23      'b'0000100110
$define s24      'b'0000100111
$define s25      'b'0000100101
$define s25a     'b'0000100000
$define s25b     'b'0000100001
```

```
$define s25c    'b'0000100100
$define s26     'b'1000100100
$define s27     'b'1110000000    /* addmatch */
$define s28     'b'1000101000
$define s29     'b'1000101100
$define s30     'b'1111000000    /* addmatch */
$define s31     'b'1000101010
$define s32     'b'1000000111
$define s33     'b'0000101000
$define s34     'b'0000001000
$define s35     'b'0000001100
$define s36     'b'0000110000
$define s37     'b'0000110001
$define s38     'b'0010000000    /* new addmatch */
$define s39     'b'0000110100
$define s40     'b'0001000000    /* new addmatch */
```

/   Logic Equations   / pckcnt = st:s34 # st:s35 # st:s39;

pe = st:s0 # st:s36;

!cmdcamlt = st:s22;

cmdcam = !q9 & !q8 & !q7 & !q6 & !q5 & !q3 & !q1 & q0/*st:s1 # st:s1a # st:s1b*/
    # !q9 & !q8 & !q7 & !q6 & q5 & !q4 & !q3 & q2/*st:s23#st:s24#st:s25#s25c */
    # st:s40;

passcntrl = st:s34;

matchlatch = st:s11;

strip = st:s39;

rdx = st:s22;

wrx = st:s1 # st:s1a # st:s24 # st:s25 # st:s40;

csx = st:s1 # st:s1a # st:s1b
    # !q9 & !q8 & !q7 & !q6 & q5 & !q4;/*s22#s23#s24#s25#s25a#s25b#s25c#
                                          s33#s40*/

/*****************************************************************/
/* Allowable Target Device Types:  20L8-15                       */
/*****************************************************************/

/ Inputs /

```
Pin 1      =  lclk       ;
Pin 2      =  !q1        ;    /* STA */
Pin 3      =  !q6        ;    /* STB */
Pin 4      =  !q9        ;    /* STC */
Pin 5      =  !q2        ;    /* STD */
Pin 6      =  !q0        ;    /* STE */
Pin 7      =  !q5        ;    /* STF */
Pin 8      =  !q4        ;    /* STG */
Pin 9      =  !q3        ;    /* STH */
Pin 10     =  !q8        ;    /* STJ */
Pin 11     =  !q7        ;    /* STK */
Pin 14     =  lbclk1     ;
```

/ Outputs /

```
Pin 15     =  !68ken     ;
Pin 16     =  !encmux    ;
Pin 17     =  !tmsltch   ;
Pin 18     =  !salwrb    ;
Pin 19     =  !salwra    ;
Pin 20     =  !salwren   ;
Pin 21     =  !wrall     ;
Pin 22     =  !csall     ;
```

/ Declarations and Intermediate Variable Definitions /

```
$define and      &
$define or       #
$define ON       'b'1
$define OFF      'b'0

FIELD st = [q9..0];

$define s0       'b'0000000000
$define s1       'b'0000000001
$define s1a      'b'0000010001    /* rst seg cnt */
$define s1b      'b'0000010101
$define s2       'b'1000000000    /* addmatch */
$define s3       'b'1000000010
$define s4       'b'1000000011
$define s5       'b'1001000000    /* addmatch */
$define s6       'b'1000000100
$define s7       'b'1000000101
$define s8       'b'1010000000    /* addmatch */
$define s9       'b'1000001000
$define s10      'b'1000001100
$define s11      'b'1000001010
$define s12      'b'1011000000    /* addmatch */
$define s13      'b'1000010000
$define s14      'b'0000010001
$define s15      'b'1100000000    /* addmatch */
$define s16      'b'1000010100
$define s17      'b'1000011100
$define s18      'b'1101000000    /* addmatch */
$define s19      'b'1000100000
$define s20      'b'1000000001
$define s21      'b'0000000011
$define s22      'b'0000100010
$define s23      'b'0000100110
$define s24      'b'0000100111
$define s25      'b'0000100101
$define s25a     'b'0000100000
$define s25b     'b'0000100001
$define s25c     'b'0000100100
$define s26      'b'1000100100
$define s27      'b'1110000000    /* addmatch */
$define s28      'b'1000101000
$define s29      'b'1000101100
$define s30      'b'1111000000    /* addmatch */
$define s31      'b'1000101010
$define s32      'b'1000000111
$define s33      'b'0000101000
$define s34      'b'0000001000
$define s35      'b'0000001100
$define s36      'b'0000110000
$define s37      'b'0000110001
$define s38      'b'0010000000    /* new addmatch */
$define s39      'b'0000110100
$define s40      'b'0001000000    /* new addmatch */

/**   Logic Equations   **/

68ken = st:s36 # st:s37 # st:s38 # st:s39;

encmux = st:s23;

tmsltch = lbclk1;

salwrb =    st:s16 # st:s17 # st:s19 # st:s20 # st:s28 # st:s29 # st:s31
         #  st:s32;

salwra =    st:s16 # st:s17 #st:s22 # st:s23 # st:s24 # st:s28 # st:s29;

salwren = !lclk &
              (st:s14
            # st:s17
            # st:s20
            # st:s22
            # st:s26
            # st:s29);

wrall =         st:s1
            #   st:s1a
            #   st:s4
```

```
                      # st:s7
                      # st:s10
                      # st:s14
                      # st:s17
                      # st:s20
                      # st:s26
                      # st:s29
                      # st:s32
                      # st:s37
                      # st:s40;

csall = o9 # st:s1 # st:s1a # st:s1b # st:s21 # st:s40;

/*******************************************************************/
/* Allowable Target Device Types:  20L8-15                         */
/*******************************************************************/

/** Inputs **/

Pin 1       =   lclk        ;
Pin 2       =   !q1         ;       /* STA */
Pin 3       =   !q6         ;       /* STB */
Pin 4       =   !q9         ;       /* STC */
Pin 5       =   !q2         ;       /* STD */
Pin 6       =   !q0         ;       /* STE */
Pin 7       =   !q5         ;       /* STF */
Pin 8       =   !q4         ;       /* STG */
Pin 9       =   !q3         ;       /* STH */
Pin 10      =   !q8         ;       /* STJ */
Pin 11      =   !q7         ;       /* STK */
Pin 14      =   !slvhold    ;

/** Outputs **/

Pin 15      =   !nopass     ;
Pin 16      =   !68kacc     ;
Pin 17      =   cep_inv     ;
Pin 18      =   !cep        ;
Pin 19      =   !clrtsa     ;
Pin 20      =   !cmdcd12    ;
Pin 21      =   !cmdcd14    ;
Pin 22      =   !cdbufen    ;

/** Declarations and Intermediate Variable Definitions **/

$define and     &
$define or      #
$define ON      'b'1
$define OFF     'b'0

FIELD st = [q9..0];

$define s0      'b'0000000000
$define s1      'b'0000000001
$define s1a     'b'0000010001    /* rst seg cnt */
$define s1b     'b'0000010101
$define s2      'b'1000000000    /* addmatch */
$define s3      'b'1000000010
$define s4      'b'1000000011
$define s5      'b'1001000000    /* addmatch */
$define s6      'b'1000000100
$define s7      'b'1000000101
$define s8      'b'1010000000    /* addmatch */
$define s9      'b'1000001000
$define s10     'b'1000001100
$define s11     'b'1000001010
$define s12     'b'1011000000    /* addmatch */
$define s13     'b'1000010000
$define s14     'b'1000010001
$define s15     'b'1100000000    /* addmatch */
$define s16     'b'1000010100
$define s17     'b'1000011100
$define s18     'b'1110000000    /* addmatch */
$define s19     'b'1000100000
$define s20     'b'1000000001
```

```
$define s21      'b'0000100011
$define s22      'b'0000100010
$define s23      'b'0000100110
$define s24      'b'0000100111
$define s25      'b'0000100101
$define s25a     'b'0000100000
$define s25b     'b'0000100001
$define s25c     'b'0000100100
$define s26      'b'1000100100
$define s27      'b'1110000000     /* addmatch */
$define s28      'b'1000101000
$define s29      'b'1000101100
$define s30      'b'1111000000     /* addmatch */
$define s31      'b'1000101010
$define s32      'b'1000000111
$define s33      'b'0000101000
$define s34      'b'0000001000
$define s35      'b'0000001100
$define s36      'b'0000110000
$define s37      'b'0000110001
$define s38      'b'0010000000     /* new addmatch */
$define s39      'b'0000110100
$define s40      'b'0001000000     /* new addmatch */

/    Logic Equations    / nopass = st:s35;

68kacc = st:s36 # st:s37 # st:s38 # st:s39;

cep =          -st:s1 # st:s4 # st:s7 # st:s10
             # st:s14 # st:s17 # st:s20 # st:s26
             # st:s29 # st:s32 # st:s37;

cep_inv = cep;

clrtsa = st:s32;

cmdcd12 = st:s23 #st:s24 # st:s25 # st:s25a;

cmdcd14 = st:s1 # st:s1a # st:s1b # st:s40;

cdbufen = q9;
```

What is claimed is:

1. An apparatus for transmitting information in packets between at least first and second data communication systems, each of said systems comprising a plurality of nodes, each of said nodes being adapted to receive and transmit packets of information, said packets of information each comprising destination address information, source address information and data, the apparatus comprising:

means for receiving a packet from the first of said data communications systems;

means for capturing destination address information from said received packet;

means for storing said captured destination address information;

means for comparing said captured destination address information to previously stored source addresses;

means for capturing source address information from said received packet; and means for storing said captured source address information;

wherein the comparison of said captured destination address information to previously stored source address information is completed before capturing said source address information from said received packet; and said packet received from said first data communications system is transmitted to said second data communications system only if said compared destination address information is not found by said means for comparing said captured destination address information to said previously stored source addresses.

2. The apparatus as claimed in claim 1, further comprising:

means for comparing said captured source address information to previously stored source addresses;

wherein said captured source address information will be added to said previously stored source addresses in said means for storing if the captured source address is not contained within said previously stored addresses.

3. A method of transmitting information in packets between at least first and second data communication systems, each of said systems comprising a plurality of nodes, each of said nodes being adapted to receive and transmit packets of information, said packets of information each comprising destination address information, source address information and data, said method comprising the steps of:

receiving a packet from the first of said data communications system;

capturing destination address information from said received packet;

storing said captured destination address information;

comparing said captured destination address information to previously stored source addresses;

capturing source address information from said received packet; and storing said captured source address information;

wherein the comparison of said captured destination address information to previously stored source address information is completed before capturing said source address information from said received packet; and the transmission of said packet received from said first data communications system to said second data communications system is executed only if said compared destination address information is not found by the step of comparing said captured destination address information to said previously stored source addresses.

4. The method as claimed in claim 3, further comprising the steps of:

comparing said captured source address information to previously stored source addresses; and adding said captured source address information to said previously stored source addresses if the captured source address is not contained within said previously stored addresses.

5. An apparatus for transmitting information in packets in a data communications system including first and second data communication subsystems, each of said subsystems comprising a plurality of nodes, each of said nodes being adapted to receive and transmit packets of information to and from the other of said nodes, said packets of information each comprising destination address information, source address information and data, the apparatus comprising:

means for receiving a packet said first subsystems means for capturing destination address information from said received packet;

means for storing said captured destination address information;

means for comparing said captured destination address information to previously stored source addresses;

means for capturing source address information from said received packet; and means for storing said captured source address information;

wherein the comparison of said captured destination address information to previously stored source address information is completed before capturing said source address information from said received packet; and said packet received from said first subsystem is transmitted to said second subsystem only if said compared destination address information is not found by said means for comparing said captured destination address information to said previously stored source addresses.

6. The apparatus as claimed in claim 5, wherein each of said subsystems are local area networks.

7. The apparatus as claimed in claim 6, wherein each of said local area networks complies substantially with IEEE standard 802.3 for Ethernet networks.

8. The apparatus as claimed in claim 6, wherein each of said local area networks complies substantially with IEEE standard 802.5 for Token Ring networks.

9. The apparatus as claimed in claim 6, wherein one of said local area networks complies substantially with one of IEEE standard 802.3 for Ethernet networks or IEEE standard 02.5 for Token Ring networks, and the other of said local area networks complies substantially with the other of said IEEE standard 802.3 for Ethernet networks or the IEEE standard 802.5 for Token Ring networks.

10. The apparatus as claimed in claim 5, said system further comprising:

means for comparing said captured source address information to previously stored source addresses; and means for adding captured source address information to said previously stored source addresses if the captured source address is not contained within said previously stored addresses.

11. An attachment for a first data communications system adapted for receiving data packets from a second data communication system and for transmitting data packets to said second data communications system, each data communications system comprising a plurality of nodes, each of said nodes being adapted to receive and transmit packets of information, said packets of information each comprising destination address information, source address information and data, said attachment comprising:

interface means for receiving a packet from the first of said data communications system;

means for capturing destination address information from said received packet;

means for storing said captured destination address information;

means for comparing said captured destination address information to previously stored source addresses;

means for capturing source address information from said received packet; and means for storing said captured source address information;

wherein the comparison of said captured destination address information to previously stored source address information is completed before capturing said source address information from said received packet; and said packet received from said first data communication system is transmitted to said second data communications system only if said compared destination address information is not found by said means for comparing said captured destination address information to said previously stored source addresses.

12. The attachment as claimed in claim 11, further including means for selectively interfacing with the data communications system through both parallel and serial data paths.

13. The attachment in claim 12, wherein said selectively interfacing means for interfacing selectively interfaces with said data communications system (a) through said parallel data path when said first data communications network substantially complies with IEEE 802.3 network standard for Ethernet, and (b) through said series data path when said first data communications network substantially complies with IEEE 802.5 network standard for Token Ring.

14. The attachment as claimed in claim 10, further comprising:

means on said attachment for comparing said captured source address information to previously stored source addresses;

wherein said captured source address information will be added to said previously stored source addresses if the captured source address is not contained within said previously stored addresses.

15. The attachment as claimed in claim 10, wherein said attachment to said first data communications system is made by way of a parallel data path.

* * * * *

UNITED STATES PATENT AND TRADEMARK OFFICE
CERTIFICATE OF CORRECTION

PATENT NO. : 5,136,580

DATED : August 4, 1992

INVENTOR(S) : Gary B. Videlock, Russell C. Gocht, AnneMarie Freitas, Mark J. Freitas It is certified that error appears in the above-identified patent and that said Letters Patent is hereby corrected as shown below:

Claim 5, column 31, line 50, after "packet" insert --from--;

Claim 9, column 32, line 15, delete "02.5" and substitute therefor --802.5--;

Claim 10, column 32, line 20, delete "said system";

Claim 11, column 32, line 31, delete "communication" and substitute therefor --communications--;

Claim 11, column 32, line 57, delete "communication" and substitute therefor --communications--;

Claim 13, column 32, line 68, delete "for interfacing selectively";

Claim 14, column 33, line 10, delete "10" and substitute therefor --11--;

Claim 15, column 34, line 8, delete "10" and substitute therefor --11--;

Signed and Sealed this

Fourteenth Day of September, 1993

*Attest:*

BRUCE LEHMAN

*Attesting Officer*  *Commissioner of Patents and Trademarks*